Sept. 24, 1968  S. L. EIDE  3,402,573
SEAL FOR FLEXIBLE COUPLING
Filed June 23, 1966
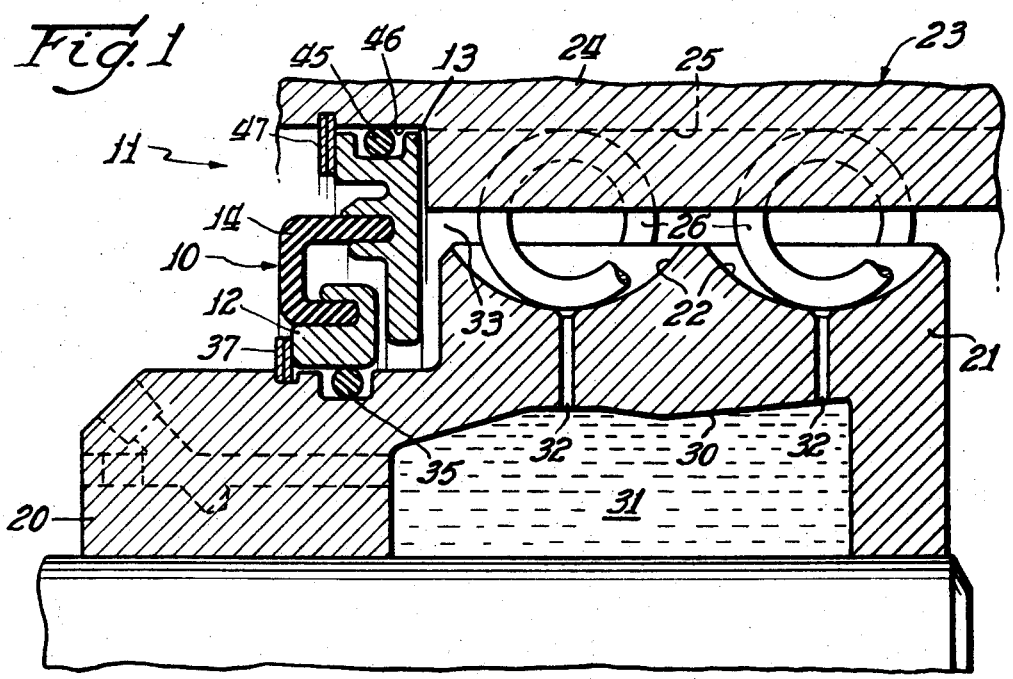
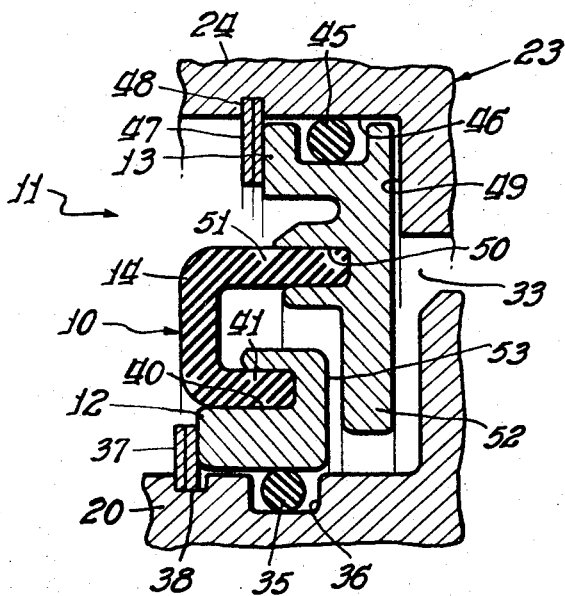
Inventor:
Stanley L. Eide
By: Evan D. Roberts atty.

United States Patent Office

3,402,573
Patented Sept. 24, 1968

3,402,573
SEAL FOR FLEXIBLE COUPLING
Stanley L. Eide, Ithaca, N.Y., assignor, by mesne assignments, to Borg-Warner Corporation, Chicago, Ill., a corporation of Delaware
Filed June 23, 1966, Ser. No. 559,920
3 Claims. (Cl. 64—11)

ABSTRACT OF THE DISCLOSURE

A flexible coupling is disclosed herein wherein the drive and driven members are flexibly interconnected in a manner which will allow these members to have several types of relative motion therebetween such as radial as well as axial, and the drive and driven members are provided with a lubricant seal structure.

---

This invention relates to an improved seal structure for couplings, and more particularly, to a seal structure for a coupling having several types of relative movements between the drive and driven members thereof.

It has been the common practice in the past where it was necessary to attempt to seal a coupling or joint, to provide a flexible membrane around the drive and driven members and in engagement therewith in an effort to enclose and seal the coupling or joint against lubricant leakage, entry of foreign articles thereinto, and other similar undesirable results.

However, in many couplings, there are relative movements between the elements of the coupling such as circumferential and radial, as well as axial. In a coupling having these movements, and particularly, in a coupling operated at high speeds, there is a tendency for the sealing member thereof to wear drastically due to the frictional engagement of the coupling elements with the elements of the seal. Also, the sealing element will rupture or fatigue as a result of the limited flexing and deformation capabilities thereof.

It is, therefore, highly desirable to provide an improved seal structure for couplings which would present an appropriate special wearing surface between the relatively movable elements thereof which are to be sealed, and to provide an appropriately elastic seal which would maintain its sealing characteristics during drastic relative angular and axial movement between the elements to be sealed without rupturing or distorting to an extent whereby its sealing characteristics are lost, and further, to limit relative axial movement between the elements sealed thereby.

A primary object of this invention is, therefore, to provide an improved seal structure, wherein a collar is provided on each member between which a seal is desired to provide a rotatable seal on the members, and a flexible seal provided between the collars and which is specifically adapted for sealing the coupling under relative rotational and axially flexing movement conditions between the members thereof, independent the relative rotational or flexing movement therebetween.

It is another object of this invention to provide an improved seal structure, wherein an elastic element is provided with collars in rotational engagement with the coupling members for completing a flexible seal between the collars which is not subject to frictional rotational motion.

With these and other objects in view, the present invention provides an improved seal structure for couplings or joints having a collar rotatably mounted on the drive member and a collar mounted on the driven member with an elastic element secured therebetween to provide a flexible seal between drive and driven members having relative rotational and angular movements therebetween.

Other objects, advantages and novel aspects of the invention will become apparent upon consideration of the following detailed description, in conjunction with the accompanying drawings wherein:

FIG. 1 is a partially sectioned view of a coupling showing a typical utilization of the improved seal structure of this invention; and FIG. 2 is an enlarged partial sectional view of the coupling shown in FIG. 1 showing the configuration and a specific application of the improved seal structure of this invention.

Referring to the drawings, there is illustrated an improved coupling seal structure 10 in operative relation with a typical coupling 11, with which it is herein utilized in exemplary fashion, and which generally includes a base collar 12, a flange collar 13, and an elastic seal element 14 secured to the collars 12 and 13 and enclosing the space therebetween.

The coupling 11 in which the improved seal 10 is utilized to exemplify this invention includes generally: a drive member 20 having a hub with one or more axial series of arcuate circumferentially spaced and axially extending slots 22 spaced in the periphery of the hub 21, and a driven member 23 having a hub 24 which is spaced from and extends over the drive hub 21, and which is provided with similar arcuate circumferentially spaced and axially extending slots 25 complementally adjacent the slots 22 of the drive hub 20.

Each series of arcuate slots in the drive hub 21 and the slots 25 in the driven hub 24 are adapted to receive a coil spring 26 therebetween. In this manner, the drive and driven members 20 and 23 are resiliently interconnected by the springs 26 so that power can be transmitted therebetween independent of any relative angular movement or misalignment of the axis of the drive or driven members 20 and 23.

The drive member 20 is provided with a chamber 30 containing a lubricant 31 which is allowed to pass through restricted lubricated conduits 32 into the slots 22 in the drive hub 21 to lubricate the interconnecting coil springs 26.

The present improved coupling lubricant seal 10 is provided between the drive and driven coupling members 20 and 23 respectively to seal the lubricant 31 within the space 33 between the drive and driven members 20 and 23. The base collar 12 is rotatably and slidably mounted on a seal ring 35 positioned in a recess 36 in the drive member 20, and is retained against axial movement to the left by an external snap-ring shoulder 37 positioned in a recess 38. The base collar 12 is provided with an annular and axially extending recess 40 which is adapted to frictionally receive and retain an inner periphery portion 41 of the elastic seal element 14.

Similarly, the flange collar 13 is rotatably and slidably mounted on an annular seal ring 45 in engagement with an inner surface 46 of the driven hub 24, and is limited in its axial movement by an external snap-ring shoulder 47 positioned in a recess 48. The flange collar 13 is provided with an annular and axially extending recess 50 adapted to frictionally receive and retain an outer peripheral portion 51 of the elastic seal element 10.

The flange collar 13 is axially positioned in the driven hub between the internal snap-ring shoulder 47 and a shoulder 49 extending inwardly from the hub 24.

The flange collar 13 is further provided with a radial portion 52 which extends inwardly and axially adjacent an inner surface 53 of the flange collar 13. This flange collar extended portion 52 is adapted to engage the base collar surface 53 to limit axial movement between the elements of the coupling 11 and the improved seal 10, and thereby tends to eliminate gross distortion of the improved seal 10 of this invention, which would otherwise lead to rupture of the seal and possible loss of lubricant within the coupling 11.

It should be noted that the improved seal structure 10 of this invention is provided with a base collar 12 and a flange collar 13 which are respectively in sliding rotational engagement with the drive and driven hub members 20 and 23 respectively and, therefore, can be specifically designed to resist this type of relative frictional engagement without regard to the flexing relative movements between the drive and driven members of the coupling 10. However, the base collar 12 and flange collar 13 are further provided with means for receiving the particular elastic seal element 14 therebetween. Said seal element 14 is thereby not in sliding rotational relative movement with respect to any element of the coupling 11 and, therefore, can be specifically designed to provide a flexible and elastic seal diaphragm element for the seal structure independent of sliding rotational relative movement between the elements of the coupling 11.

With this improved seal structure 10, it is therefore possible to provide a seal structure for couplings which provides specialized wear elements such as collars 12 and 13 in engagement with the drive and driven members 20 and 23 of the coupling 11, and which is further provided with a specialized elastic sealing member 14 to maintain the required flexible sealing characteristics during drastic relative angular and axial relative movement between the elements of a coupling to be sealed by the improved seal structure 10.

Further, the improved seal structure 10 of this invention provides for a limitation of the relative axial movement of the elements thereof by means of the flange collar portion 52 that is designed to radially overlap the base collar surface 53, and thereby tends to eliminate excessive relative axial and angular movements of the elements of the coupling 11 and the seal 10 to thereby prevent rupture or distortion of the seal structure that would otherwise tend to occur and cause the loss of the desired sealing characteristics.

It is to be understood that the invention is not to be limited to the specific constructions and arrangements shown and described, as it will be understood to those skilled in the art that changes may be made without departing from the principles of the invention.

What is claimed is:

1. An improved seal structure for couplings of the general type having flexibly interconnected circular drive and driven members comprising a base collar rotatably mounted on the drive member between the drive and driven members, a flange collar mounted on and rotatable relative to the driven member between the drive and driven members, and an elastic element secured to said base collar and said flange collar to provide a seal between the drive and driven members.

2. An improved seal structure as defined in claim 1 having shoulder means for securing said base collar and said flange collar against axial movement out of the coupling on said drive and driven members respectively.

3. An improved seal structure as set forth in claim 2 wherein said flange collar has a portion thereof extending radially axially adjacent said base collar to limit respective axial movement between the drive and driven coupling members.

References Cited

UNITED STATES PATENTS

| | | | |
|---|---|---|---|
| 2,096,039 | 10/1937 | Higgins | 64—15 |
| 2,323,569 | 7/1943 | Rzeppa | 64—32 |
| 2,891,394 | 6/1959 | Goloff et al. | 64—14 |
| 2,959,943 | 11/1960 | Allen | 64—9 |
| 2,974,501 | 3/1961 | Kaufman et al. | 64—9 |
| 2,975,620 | 3/1961 | Shipley et al. | 64—9 |
| 3,017,756 | 1/1962 | Sharp | 64—21 |

HALL C. COE, *Primary Examiner.*